US012782882B2

(12) United States Patent
Tan et al.

(10) Patent No.: US 12,782,882 B2
(45) Date of Patent: Nov. 3, 2026

(54) DISPLAY METHOD, WRIST-WORN DEVICE AND COMPUTER-READABLE STORAGE MEDIUM

(71) Applicant: GOERTEK INC., Weifang (CN)

(72) Inventors: Shumin Tan, Weifang (CN); Shupeng Li, Weifang (CN)

(73) Assignee: GOERTEK INC., Weifang (CN)

( * ) Notice: Subject to any disclaimer, the term of this patent is extended or adjusted under 35 U.S.C. 154(b) by 293 days.

(21) Appl. No.: 18/404,351

(22) Filed: Jan. 4, 2024

(65) Prior Publication Data

US 2024/0152098 A1 May 9, 2024

Related U.S. Application Data

(63) Continuation of application No. PCT/CN2021/127819, filed on Nov. 1, 2021.

(30) Foreign Application Priority Data

Jul. 5, 2021 (CN) ......................... 202110764874.4

(51) Int. Cl.
*G04B 37/14* (2006.01)
*G04B 45/00* (2006.01)
*G04G 9/00* (2006.01)

(52) U.S. Cl.
CPC ....... *G04G 9/0041* (2013.01); *G04B 37/1486* (2013.01); *G04B 45/0015* (2013.01); *G04G 9/0047* (2013.01); *G04G 9/0064* (2013.01)

(58) Field of Classification Search
CPC .. G04G 9/0041; G04G 9/0047; G04G 9/0064; G04B 37/1486; G04B 45/0015
See application file for complete search history.

(56) References Cited

U.S. PATENT DOCUMENTS 9,845,816 B2 12/2017 Brashnyk et al.
10,175,653 B1 1/2019 Bloom et al.
(Continued)

FOREIGN PATENT DOCUMENTS

CN 204288017 U 4/2015
CN 206369589 U 8/2017
(Continued)

OTHER PUBLICATIONS

First Office Action in Corresponding Chinese Application No. 202110764874.4, dated May 16, 2023; 12 pgs.
(Continued)

*Primary Examiner* — Sean Kayes
(74) *Attorney, Agent, or Firm* — HAUPTMAN HAM, LLP

(57) ABSTRACT

Disclosed are a display method, a wrist-worn device and a computer-readable storage medium. The display method is applied to the wrist-worn device. The display method includes: emitting, via a light source, a first detection light; receiving, via a light identification unit, the second detection light formed by the first detection light and identifying the light parameter of the second detection light, wherein the light parameter of the second detection light carries the style information of the wristband; reading, via the controller, the style information and generating a screen display control signal according to the style information; and controlling, via the controller, the display unit on the device body to display a corresponding display mode according to the screen display control signal.

9 Claims, 10 Drawing Sheets

(56) References Cited

U.S. PATENT DOCUMENTS

| | | | | |
|---|---|---|---|---|
| 10,616,400 | B2 * | 4/2020 | Ma | H04M 1/72454 |
| 10,931,002 | B1 | 2/2021 | Nocon | |
| 11,000,194 | B2 * | 5/2021 | Wang | A61B 5/02125 |
| 11,165,141 | B2 * | 11/2021 | Hsu | H01Q 1/273 |
| 11,611,372 | B1 * | 3/2023 | Hiemstra | G06K 19/06028 |
| 11,652,509 | B1 * | 5/2023 | Hiemstra | A44C 5/147 343/720 |
| 11,949,466 | B1 * | 4/2024 | Hiemstra | G06K 19/06028 |
| 12,204,292 | B1 * | 1/2025 | Beyhs | G04G 9/0064 |
| 2015/0120020 | A1 * | 4/2015 | Armstrong | G04G 17/08 700/91 |
| 2018/0055159 | A1 * | 3/2018 | Park | G04G 21/08 |
| 2019/0086875 | A1 * | 3/2019 | Cardinali | G04G 21/025 |
| 2021/0050882 | A1 * | 2/2021 | Jia | H04B 5/79 |
| 2022/0100151 | A1 * | 3/2022 | Pandya | G04B 37/084 |

FOREIGN PATENT DOCUMENTS

| | | | |
|---|---|---|---|
| CN | 108664203 | A | 10/2018 |
| CN | 210248687 | U | 4/2020 |
| CN | 212787718 | U | 3/2021 |
| CN | 113535106 | A | 10/2021 |
| DE | 102018105452 | A1 | 9/2019 |
| EP | 3292783 | A1 | 3/2018 |
| EP | 3348164 | A1 | 7/2018 |
| KR | 20090012128 | U | 12/2009 |

OTHER PUBLICATIONS

International Search Report and Written Opinion in Corresponding International Application No. PCT/CN2021/127819, mailed Apr. 6, 2022; 14 pgs.

Notification to Grant in Corresponding Chinese Application No. 202110764874.4, dated Oct. 11, 2023; 7 pgs.

Yang, Y., "Identify the Problems Existing in the Clinical Application of Wristbands and Improve Countermeasures," Hospital management forum, vol. 28, No. 9, Sep. 28, 2011; 3 pgs.

* cited by examiner

DISPLAY METHOD, WRIST-WORN DEVICE AND COMPUTER-READABLE STORAGE MEDIUM

CROSS-REFERENCE TO RELATED APPLICATIONS

The present application is a continuation application of International Application No. PCT/CN2021/127819, filed on Nov. 1, 2021, which claims priority to Chinese Patent Application No. 202110764874.4, filed on Jul. 5, 2021. The disclosures of the above-mentioned applications are incorporated herein by reference in their entireties.

TECHNICAL FIELD

The present application relates to the technical field of wrist-worn devices, and in particular to a display method, a wrist-worn device and a computer-readable storage medium.

BACKGROUND

With the development of electronic technology, wrist-worn devices, including wrist-worn devices and smart bracelets, are becoming more and more popular among people. The wrist-worn device not only has the traditional function of checking time, but can also operate calls, text messages, emails, photos, music, etc. in the smartphone connected to it. The wrist-worn device can also insert a SIM card to make and answer calls, and even perform sensitive operations such as network payments. At present, wrist-worn devices play an important role in people's lives. Users need to wear wrist-worn devices for long periods of time. As a result, users often need to consider the matching of wrist-worn devices and clothing when wearing wrist-worn devices, and often need to change the corresponding style of wristbands according to different dressing styles. However, it is difficult to match the same device body with different styles of wristbands, which greatly affects the user experience.

SUMMARY

The main purpose of the present application is to propose a display method that enables the display mode of the device body to correspond to the style of the wristband, so that the overall style of the wrist-worn device is consistent, thereby improving the user experience.

In order to achieve the above purpose, the display method proposed by the present application is applied to a wrist-worn device. The wrist-worn device includes a device body and a wristband connected to the device body. The display method includes:

- emitting, via a light source, a first detection light;
- receiving, via a light identification unit, a second detection light formed by the first detection light, and identifying, via the light identification unit, a light parameter of the second detection light, the light parameter of the second detection light carries style information of a wristband;
- reading, via a controller, the style information, and generating, via the controller, a screen display control signal according to the style information; and
- controlling, via the controller, a display unit on a device body to display a corresponding display mode according to the screen display control signal.

In an embodiment, before the emitting, via the light source, the first detection light, the display method further includes: presetting a corresponding relation between different style information and different display modes.

In an embodiment, the display mode includes a UI theme adapted to the style information of the wristband and/or display content adapted to a usage scenario.

In an embodiment, the device body has a housing, and the light identification unit is provided on an inner side of the housing; the light source is provided on the device body, and the emitting, via the light source, the first detection light includes:

- emitting, via the light source, the first detection light to the wristband;
- receiving, via the light identification unit, the second detection light formed by the first detection light, and identifying, via the light identification unit, the light parameter of the second detection light includes:
- refracting, via the housing, the first detection light and reflecting, via the wristband, the first detection light to form the second detection light; and
- receiving, via the light identification unit, the second detection light and identifying, via the light identification unit, the light parameter of the second detection light;
- the light parameter of the second detection light carries an optical property of the wristband, and the optical property of the wristband corresponds to a style, so that the optical property become the style information; or
- the light source is provided on the wristband, and the emitting, via the light source, the first detection light includes:
- emitting, via the light source, the first detection light to the device body, the light parameter of the first detection light corresponds to the style of the wristband, so that the light parameter of the second detection light carries the style information of the wristband;
- receiving, via the light identification unit, the second detection light formed by the first detection light and identifying, via the light identification unit, the light parameter of the second detection light includes:
- refracting, via the housing, the first detection light to form the second detection light; and
- receiving, via the light identification unit, the second detection light, and identifying, via the light identification unit, the light parameter of the second detection light.

In an embodiment, the light identification unit is a color sensor, when the light source is installed on the device body, the first detection light is reflected by the wristband to form a reflected light, a color of the reflected light corresponds to the style of the wristband, so that a color parameter of the second detection light carries the style information of the wristband;

- when the light source is provided on the wristband, a color of the first detection light corresponds to the style of the wristband, so that the color parameter of the second detection light carries the style information of the wristband;
- receiving, via the light identification unit, the second detection light and identifying, via the light identification unit, the light parameter of the second detection light includes:
- receiving, via the color sensor, the second detection light and identifying, via the color sensor, the color parameter of the second detection light;

reading, via the controller, the style information and generating, via the controller, the screen display control signal according to the style information includes:

generating, via the controller, the screen display control signal according to the color parameter.

In an embodiment, the wristband includes a connection part and a wristband body, the wristband body is connected to the housing through the connection part, and when the light source is provided on the device body, the color of the connection part and/or the wristband body corresponds to the style of the wristband.

In an embodiment, when the light source is installed on the device body, the light source is a colorless light source, and the first detection light is a colorless light; or when the light source is installed on the wristband, the light source is a colored light source.

In an embodiment, the wristband is made of a light-guiding material;

when the light source is provided on the device body, the light source is provided on the inner side of the housing, and the first detection light is transmitted through the wristband after being refracted by the housing and reaching the wristband, to cause the wristband to emit light; or when the light source is provided on the wristband, the light source also emits the first detection light towards a direction away from the device body, and the first detection light is transmitted through the wristband to cause the wristband to emit light.

The present application also proposes a wrist-worn device, the wrist-worn device includes a memory, a processor, and a display program stored in the memory and executable on the processor, and steps of the display method as described above are implemented when the display program is executed by the processor.

The present application also proposes a computer-readable storage medium, a display program is stored in the computer-readable storage medium, and when steps of the display method as described above are implemented when the display program is executed by the processor.

In the display method of the present application, the first detection light emitted by the light source can carry the style information of the wristband after forming the second detection light. The light identification unit identifies the light parameter of the second detection light and transmits it to the controller. The controller can read the style information to determine the style of the wristband, and then generate a screen display control signal according to the style information, and use this as a basis to control the display unit to display the corresponding display mode. In this way, the display mode of the display unit will match the style of the wristband to make the overall style of the wrist-worn device consistent, making it easier for the user to dress and match, thus improving the user experience. Thus, the user can configure multiple sets of wristbands of different styles for a device body. Through the display method of the present application, the display unit can display screens with different styles according to the wristbands of different styles to ensure that the styles of the wristbands and the device theme are harmonious and unified.

BRIEF DESCRIPTION OF THE DRAWINGS

In order to describe the technical solutions in the embodiments of the present application or in the related art more clearly, the accompanying drawings required to be used in the description of the embodiments or the related art will be briefly introduced below. Obviously, the accompanying drawings in the following description are only some embodiments of the present application. For those skilled in the art, other drawings can be obtained based on the structures shown in these drawings without creative efforts.

Figure 1:
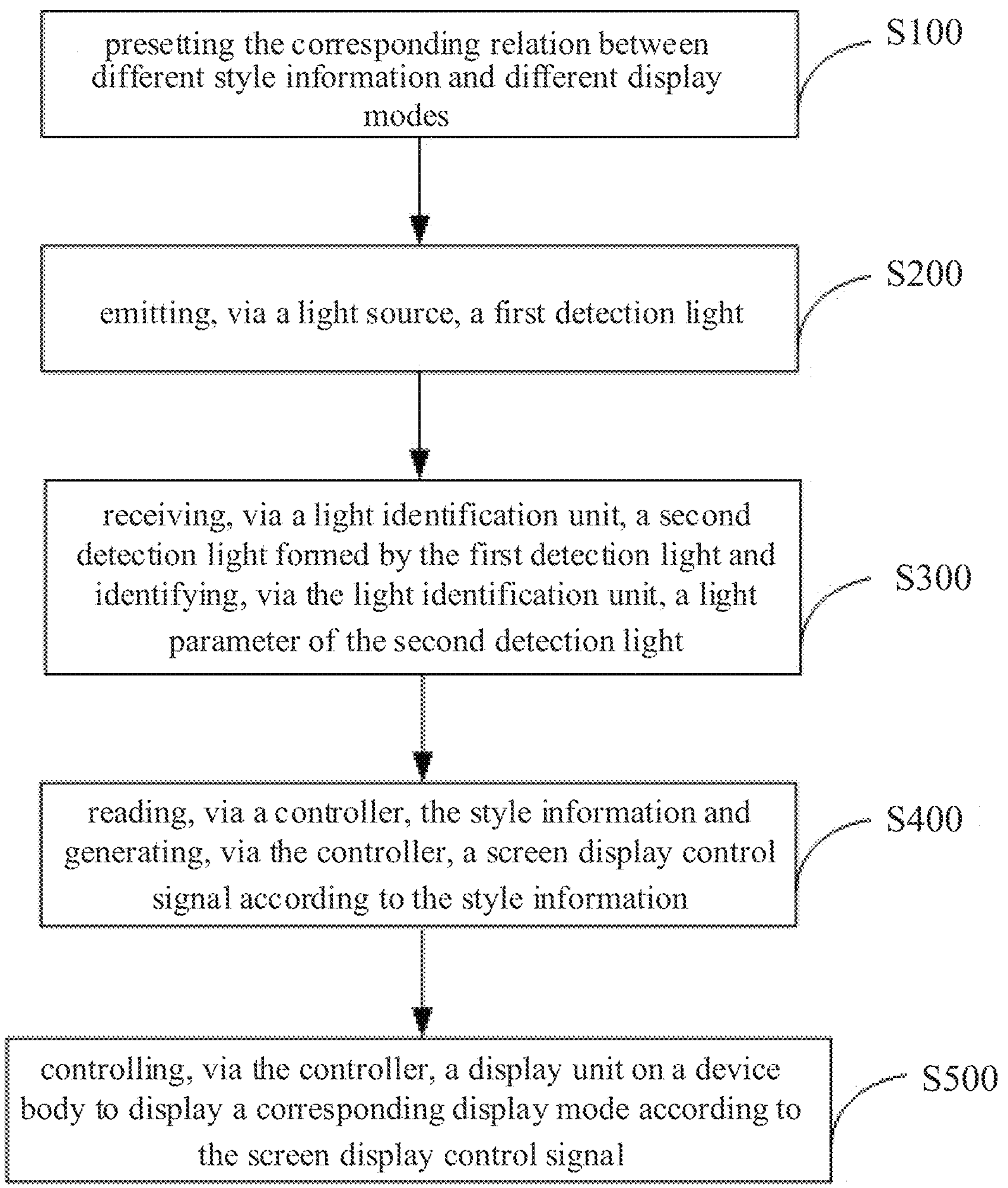
FIG. 1 is a schematic flowchart of a display method according to an embodiment of the present application.

The realization of the purpose, functional features and advantages of the present application will be further described in conjunction with the embodiments, with reference to the accompanying drawings.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are only some rather than all of the embodiments of the present application. Based on the embodiments in the present application, all other embodiments obtained by those skilled in the art without creative efforts fall within the scope of the present application.

It should be noted that if the embodiments of the present application involve directional indications (such as up, down, left, right, front, back . . . ), the directional indications are only used to explain the relative positional relationship between the components, movement conditions and the like in a specific posture (as shown in the drawings). If the specific posture changes, the directional indication will also change accordingly.

In addition, if there are descriptions involving “first”, “second”, etc. in the embodiments of the present application, the descriptions of “first”, “second”, etc. are only for descriptive purposes and cannot be understood as indicating or implying its relative importance or implicitly indicating the number of technical features indicated. Therefore, features defined with “first” and “second” can explicitly or implicitly include at least one of these features. In addition, if the meaning of “and/or” in the entire text is to include three parallel solutions, taking “A and/or B” as an example, including solution A, or solution B, or a solution that both A and B satisfy. In addition, the technical solutions in various embodiments can be combined with each other, but it must be based on the realization by those skilled in the art. When the combination of technical solutions is contradictory or cannot be realized, it should be considered that such a combination of technical solutions does not exist, nor within the scope of the present application.

The present application proposes a display method.

Figure 2:
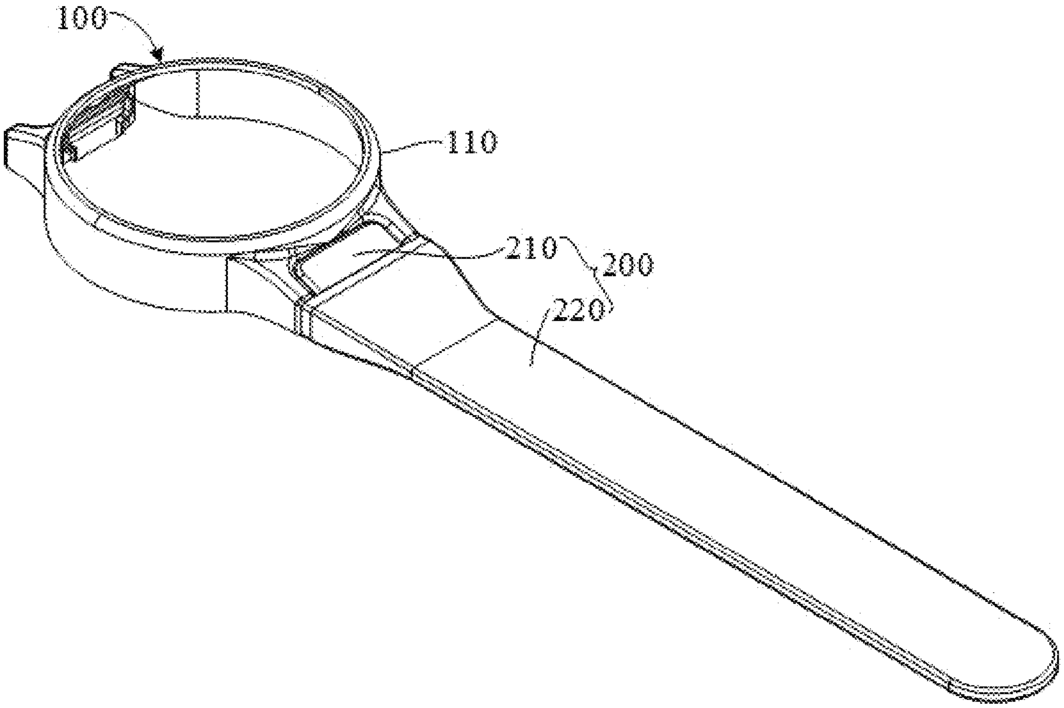
FIG. 2 is a schematic diagram of an assembly structure of a wrist-worn device corresponding to the display method according to an embodiment of the present application.
Figure 3:
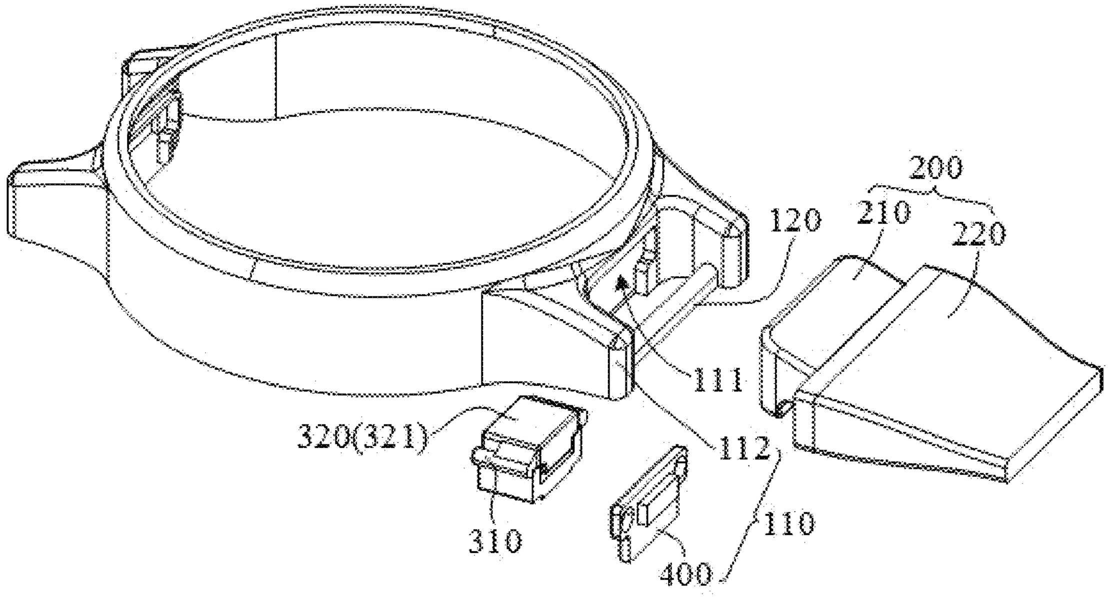
FIG. 3 is an exploded schematic structural diagram of the wrist-worn device corresponding to the display method according to an embodiment of the present application.

In an embodiment of the present application, please referring to FIG. 1 to FIG. 3, the display method includes:

S200, emitting, via a light source 310, a first detection light;

S300, receiving, via a light identification unit 320, a second detection light formed by the first detection light and identifying, via the light identification unit 320, a light parameter of the second detection light; the light parameter of the second detection light has style information of the wristband 200;

S400, reading, via a controller, the style information and generating, via the controller, a screen display control signal according to the style information; and S500, controlling, via the controller, a display unit on a device body 100 to display a corresponding display mode according to the screen display control signal.

It can be understood that when a user wear a wristband device, they often need to consider the matching of the wristband device and clothing, and often need to change different types of wristbands 200 according to different dressing styles. However, in the related art, the unchanged device body 100 is difficult to match with different styles of wristbands 200, which greatly affects the user experience.

In the display method of the present application, the first detection light emitted by the light source 310 can carry the style information of the wristband 200 after forming the second detection light. The light identification unit 320 identifies the light parameter of the second detection light and sends it to the controller. The controller can read the style information to determine the style of the wristband, and then generate the screen display control signal according to the style information, which is used as a basis to control the display unit to display the corresponding display mode. In this way, the display mode of the display unit will match the style of the wristband 200 so that the overall style of the wrist-worn device is consistent, making it easier for the user to dress and match, thereby improving the user's experience. Therefore, the user can configure multiple sets of different styles of wristbands 200 for the device body 100. Through the display method of the present application, the display unit can display different styles of display screens according to the different styles of wristbands 200 to ensure that the style of the wristbands 200 and the device theme is harmonious and unified.

Further, in this embodiment, the display mode includes a UI theme adapted to the style information of the wristband 200 and/or display content adapted to the usage scenario.

It can be understood that existing wrist-worn devices have many functions, and different functions correspond to different display contents. The display content covers one or more of the user's heart rate, user's exercise path, blood oxygen, blood sugar, step count, time, date, exercise mode and sleep monitoring, and is not limited to the above examples. If all these display contents are displayed on the display screen, it will cause great inconvenience for the user to obtain information. Therefore, it is necessary to configure different display contents for the display unit (i.e., the user interface of the device body 100) according to different usage scenarios. Considering that users will change different styles of wristbands 200 according to different dressing styles in different usage scenarios, the wristband 200 and the display content suitable for the same usage scenario can be pre-associated, so that the display unit can automatically configure display modes for different display contents for the user according to different usage scenarios. Furthermore, when the user selects different styles of wristbands 200 according to specific usage scenario requirements, the controller will also automatically adapt a UI theme to the device body 100 that matches the style of the wristband. In different UI themes, in order to match the style of the wristband 200, different display backgrounds and icons of different shapes and colors can be configured. Different arrangements can also be used to plan the distribution of icons, or different animation display effects can also be matched. In this way, the style of the wristband, the display content and the UI theme of the device body 100, and the usage scenario can be organically unified.

Without loss of generality, when the user needs to go out for sports, the user will change the sports-style wristband 200 to match the sportswear. At this time, the display unit will synchronously switch to a display mode suitable for sports. In this display mode, the user interface is converted to a theme style that matches the sports scene, and the focus of the display content will be converted to items such as the user's heart rate, the user's exercise path, the user's exercise time timing, step counting and mileage, so as to organically unify the style of the wristband, the display content and the UI theme of the device body 100, and sports scenes. When the user is working, in order to match the formal attire, the user will change the wristband 200 that matches the workplace style. At this time, the display unit will synchronously switch to a display mode suitable for work. In this display mode, the user interface is converted to a theme suitable for the workplace style, and the focus of the display content will be converted to the user's schedule reminder. When the user goes out for a trip, the user will change the casual style wristband 200 to match the casual wear. At this time, the display unit will synchronously switch to a display mode suitable for travel. In this display mode, the user interface is converted to a travel-style theme, and the focus of the display content will be converted to items such as real-time outdoor weather forecast, travel guide and map navigation.

Further, in this embodiment, as shown in FIG. 1, before step S200, the method also includes:

S100, presetting the corresponding relation between different style information and different display modes.

It can be understood that the style information is a light parameter. Within a certain detection error range, the style information of the wristbands 200 with the same style will be within a range. Therefore, when presetting the association between the style information and the display mode, the display mode should be associated with the style information within a certain range.

In this embodiment, the style information is associated with the display mode, and the style information corresponds to the style of the wristband 200. The style of the display mode of the device body 100 is harmoniously unified with the style of the wristband 200. Therefore, the user can choose different styles of wristbands 200 for different usage scenarios, and the display unit of the device body 100 can be configured with a display mode of the corresponding style, thereby realizing the organic unity of the wristband 200, the device body 100 and the usage scenarios. Furthermore, the user can also customize the UI themes or display content for different display modes, so that the display modes in different usage scenarios are more in line with the user's preferences and usage habits.

Figure 7:
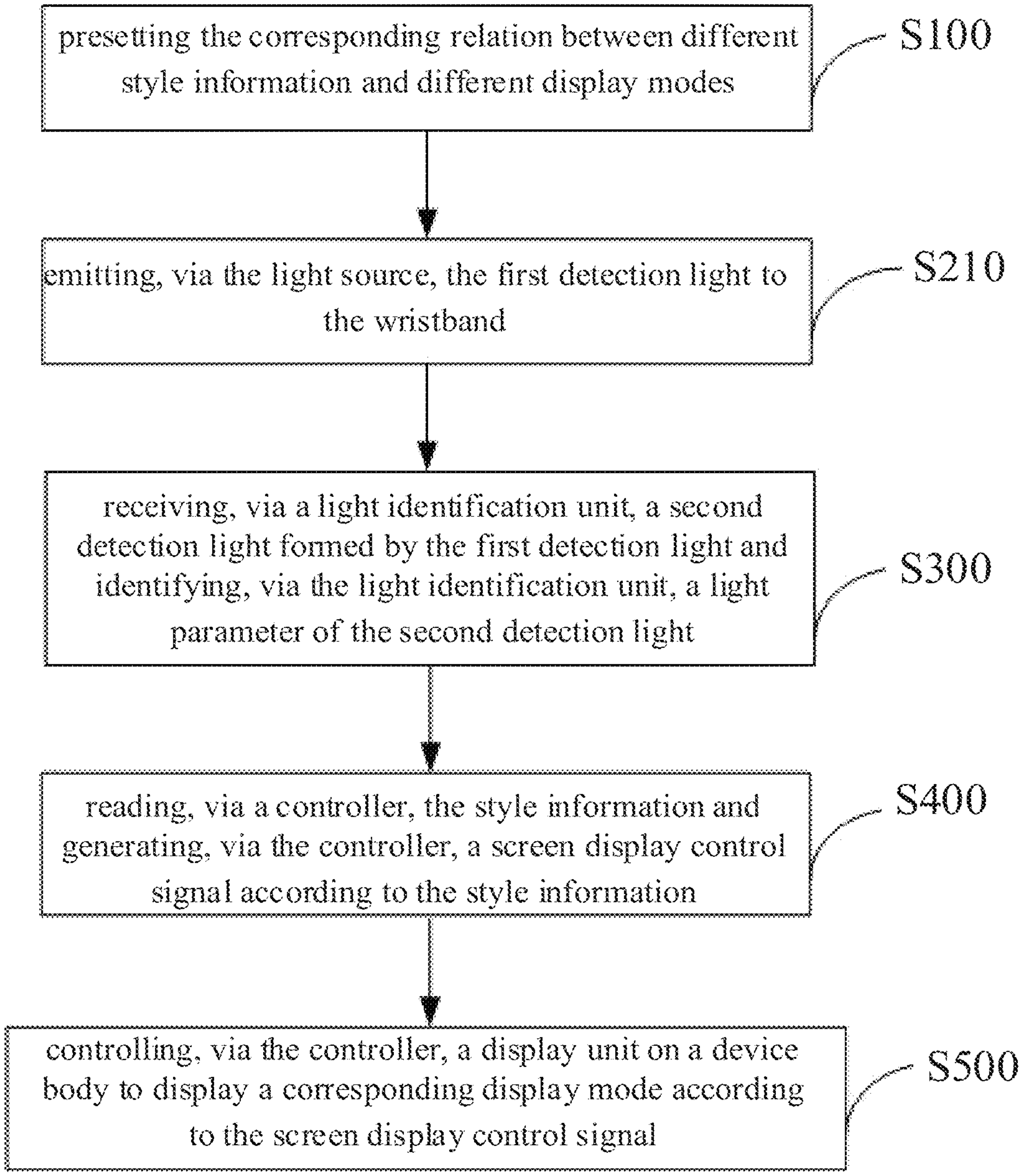
FIG. 7 is a schematic flowchart of the display method according to another embodiment of the present application.

Further, in this embodiment, the device body 100 has a housing 110, the light identification unit 320 is provided on an inner side of the housing 110; and the light source 310 is provided in the device body 100. As shown in FIG. 7, the step S200 includes:

S210, emitting, via the light source 310, the first detection light to the wristband 200.

Figure 8:
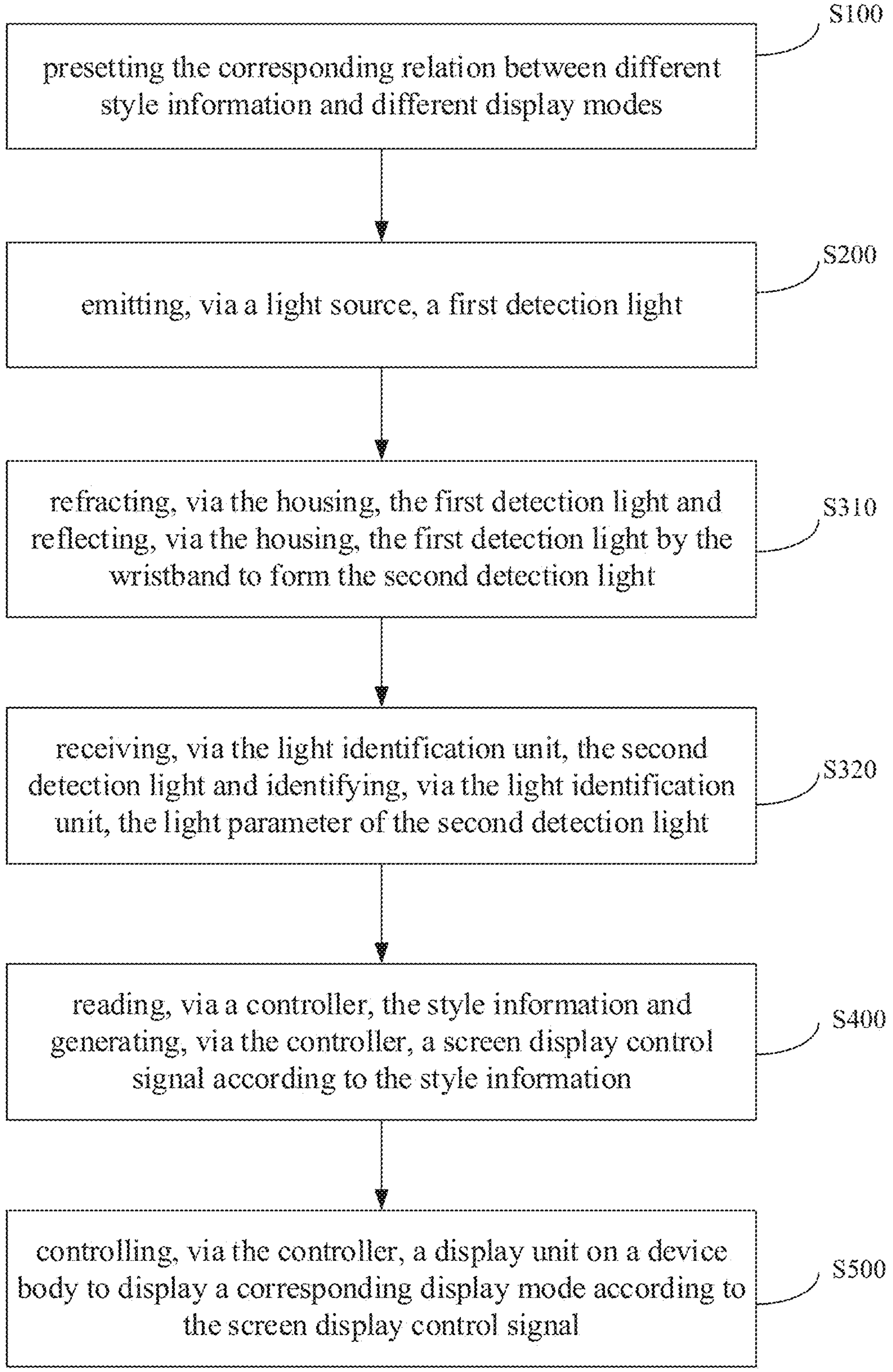
FIG. 8 is a schematic flowchart of the display method according to another embodiment of the present application.

As shown in FIG. 8, the step S300 includes: S310, refracting, via the housing 110, the first detection light and reflecting, via the housing 110, the first detection light by the wristband 200 to form the second detection light; and S320, receiving, via the light identification unit 320, the second detection light and identifying, via the light identification unit 320, the light parameter of the second detection light.

The light parameter of the second detection light has the optical properties of the wristband 200, and the optical properties of the wristband 200 correspond to the style, so that the optical properties become the style information.

Figure 5:
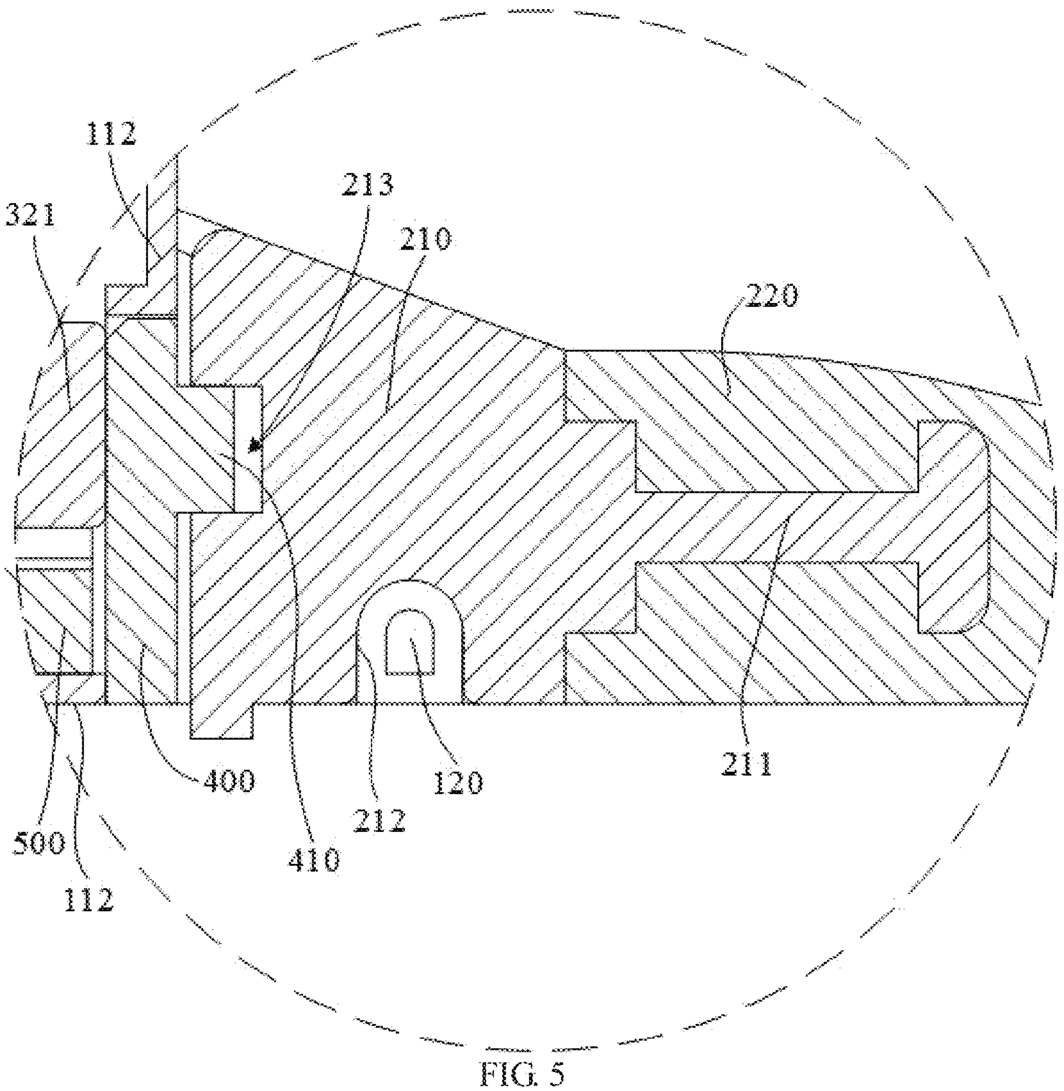
FIG. 5 is a partial cross-sectional view of the wrist-worn device corresponding to the display method according to an embodiment of the present application.

Without loss of generality, in this embodiment, as shown in FIG. 5, the light source 310 and the light identification unit 320 are provided on the inner side of the housing 110 to facilitate wiring. The wrist-worn device is provided with two light sources 310. The two light sources 310 are provided on both sides of the light identification unit 320, so that the light emitted by the light source 310 can evenly illuminate the wristband 200 and the intensity of the first detection light can be increased. Correspondingly, the light intensity of the second detection light can also be increased, which is beneficial to the identification by the light identification unit 320.

Figure 4:
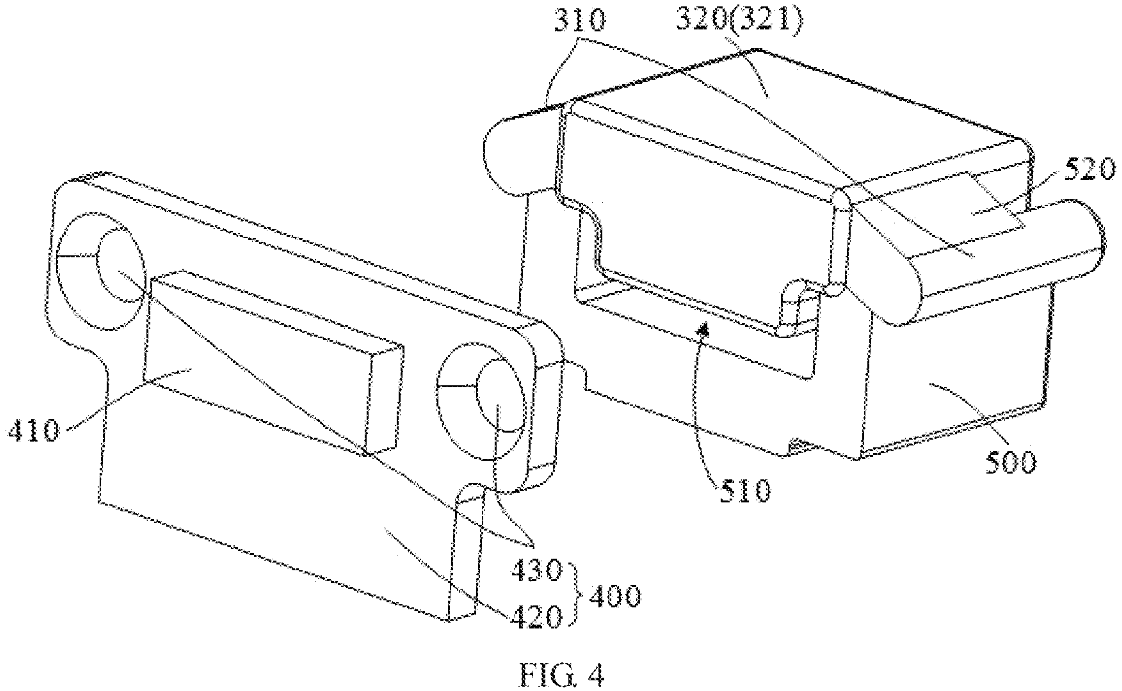
FIG. 4 is a partial schematic structural diagram of the wrist-worn device corresponding to the display method according to an embodiment of the present application.

Please referring to FIG. 4, the light source 310 and the light identification unit 320 are fixed on a mounting base 500. The mounting base 500 can be fixedly connected to the housing 110 through gluing or welding. The mounting base 500 has a mounting groove 510 for installing the light identification unit 320. The outer sides of the two groove walls of the mounting groove 510 each have a mounting buckle 520 for the light source 310 to snap into. In other embodiments, the mounting base 500 may not be provided, the housing of the light source 310 is connected to the housing of the light identifier, and the housing of the light identifier is directly connected to the housing 110 of the device body 100.

The housing 110 includes a housing body 112 and a light guide 400. The housing body 112 has a light guide hole 111 opposite to the light source 310 and the light identification unit. The light guide 400 is installed on the light guide hole 111, and arranged relative to the wristband 200. In this embodiment, by providing the light guide 400 to transmit light, the material of the housing body 112 does not need to be made of a light guide material, which can reduce the production cost of the wristband device of the present application. In other embodiments, the light guide 400 may not be provided, and a part of the housing body 112 opposite to the light source 310 and the light identification unit can be processed accordingly, so that this part of the housing body 112 can guide light.

Further, the light guide 400 is connected to the housing body 112 through ultrasonic welding. Specifically, by transmitting high-frequency vibration waves to an outer peripheral edge of the light guide 400 and an inner peripheral wall of the light guide hole 111, the outer peripheral edge of the light guide 400 and the inner peripheral wall of the light guide hole 111 are rubbed against each other under pressure, forming a fusion between molecular layers, so that the light guide 400 is stably installed in the light guide hole 111. Furthermore, in this embodiment, the outer peripheral edge of the light guide 400 and the inner peripheral wall of the light guide hole 111 are tightly welded to ensure the waterproof performance of the device body 100. It can be understood that if there is a fitting gap between the light guide 400 and the light guide hole 111, moisture in the external environment can enter the housing 110 through the fitting gap, which will have an impact on the circuit of the device body 100, thus affecting the performance of the wristband device. In other embodiments, the light guide 400 can also be installed in the light guide hole 111 by gluing. In particular, to ensure waterproofing, waterproof glue should be used.

Further, as shown in FIG. 4, the light guide 400 includes a light transmission part 430 disposed relative to the light source 310 and a main body part 420 surrounding the light transmission part 430. The thickness of the light transmission part 430 is thinner than that of the main body part 420. That is, the light identification unit 320 will be provided relative to the main body part 420 between two light-transmitting parts 430, and two light sources 310 will be provided relative to the two light-transmitting parts 430. Specifically, in this embodiment, the portion of the light guide 400 opposite to the light source 310 is recessed towards the side away from a connection part 210 on a side close to the connection part 210 to form the light transmission part 430. The light transmission part 430 is used for the detection light to pass through, and the thinning design of the light transmission part 430 can prevent the first detection light from being excessively consumed in the light transmission part 430, thereby further increasing the light intensity of the second detection light. In addition, considering factors such as the structural strength of the light guide 400 and the connection stability between the light guide 400 and the housing body 112, the thickness of the main body part 420 is set to be equivalent to the thickness of the housing body 112.

Therefore, in this embodiment, the first detection light emitted by the light source 310 will sequentially pass through the refraction of the light transmission part 430, the reflection of the wristband 200 and the refraction of the main body part 420 to form the second detection light. In the process of forming the second detection light from the first detection light, it undergoes reflection by the wristband 200, allowing the light parameter of the second detection light to carry the optical properties of the wristband 200. It can be understood that the optical properties of a substance mainly refer to the various properties exhibited by the substance in absorbing, reflecting and refracting light, as well as the light interference and scattering caused by the substance. The optical properties of the substance include the color, streaks, gloss and transparency etc. of the substance. The optical properties of the wristband 200 correspond to its style, and the optical properties of the wristband 200 are also the style information of the wristband 200. Therefore, after receiving the second detection light, the light identification unit 320 transmits the light parameter of the identified second detection light to the controller, and the controller can read the optical properties of the wristband 200 in the light parameter, thereby determining the style of the wristband 200, so that the display unit can display the corresponding display mode.

In other embodiments, the light source can be provided on the outer side of the housing, and the first detection light is reflected by the wristband and then refracted by the housing to form the second detection light for identification by the light identification unit.

Furthermore, in this embodiment, the light identification unit 320 is a color sensor 321. The first detection light is reflected by the wristband 200 to form a reflected light. The color of the reflected light corresponds to the style of the wristband 200, and the color parameter of the second detection light carries the style information of the wristband 200.

Figure 9:
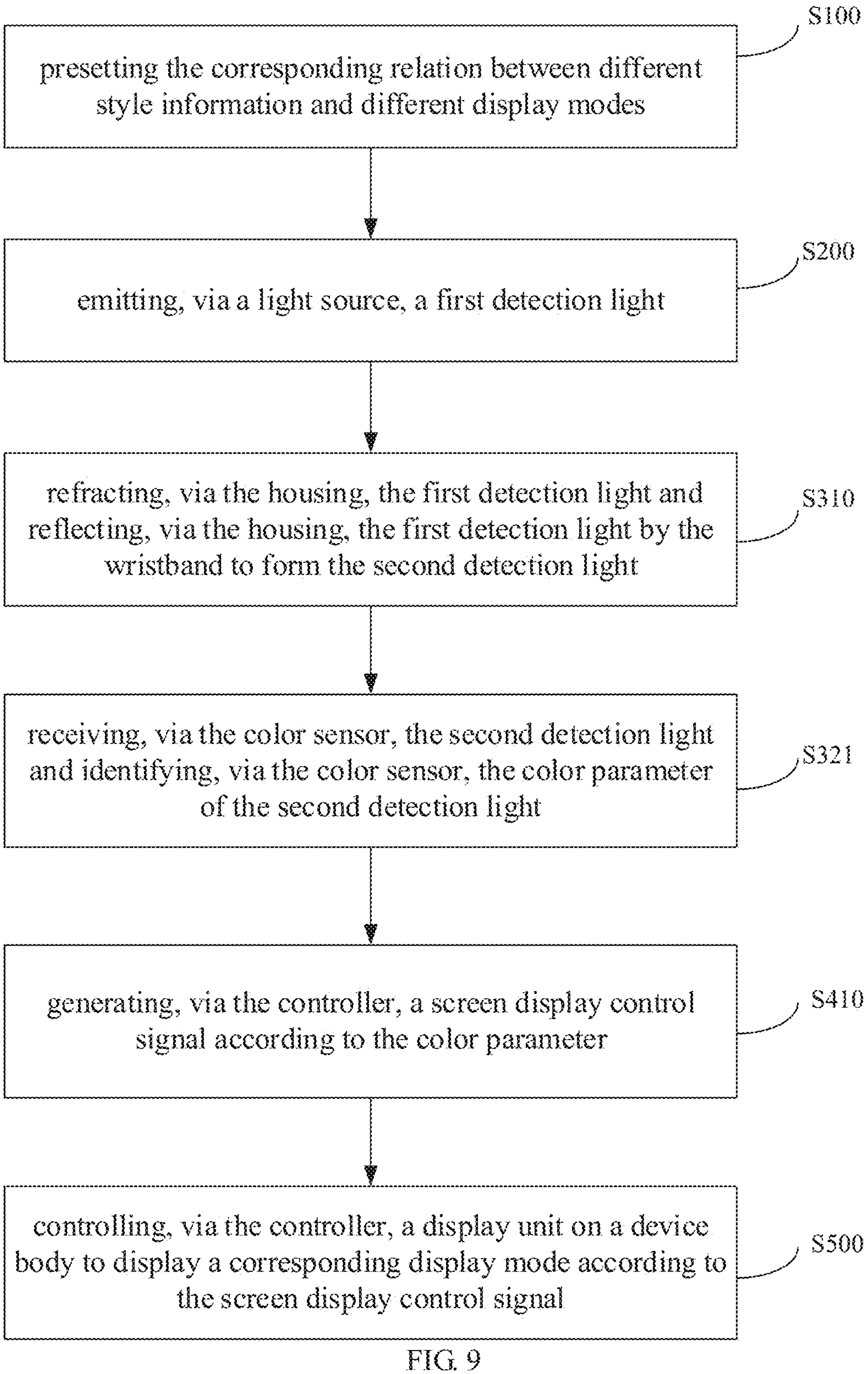
FIG. 9 is a schematic flowchart of the display method according to another embodiment of the present application.

As shown in FIG. 9, the step S320 includes:

S321, receiving, via the color sensor 321, the second detection light and identifying, via the color sensor 321, the color parameter of the second detection light;

the step S400 includes:

S410, generating, via the controller, a screen display control signal according to the color parameter.

The color sensor 321 is a small digital sensor that can convert red, green and blue components of light into a certain frequency pulse signal. It does not require an A/D converter or an impedance amplifier, and can directly measure RGB color information of the object to be measured. The color sensor 321 has high reliability in detecting similar colors and tones, and is widely used in colorimetric analysis.

It can be understood that the reflected light is formed by the reflection of the first detection light through the wristband 200, and can carry the optical properties of the wristband 200. The color sensor 321 can identify the optical property of color. In this embodiment, the wristband 200 has a color corresponding to its style, the first detection light can carry this color when reflected on the wristband 200, so that the color of the reflected light can correspond to the style of the wristband 200, and the second detection light is formed by the refraction of the reflected light through the housing 110, and its color parameter is also the style information of the wristband 200. Therefore, for the color sensor 321, the style information of the wristband 200 can be obtained by identifying the color parameter of the second detection light; for the controller, the style of the wristband 200 can be determined by reading the color parameter, and according to the screen display control signal formed based on the color parameter, the display unit can be controlled to display a display mode corresponding to the style of the wristband 200.

In other embodiments, the end of the wristband connected to the device body can be provided with a mark with a specific shape corresponding to the style of the wristband, and the light recognition unit is a charge-coupled device (CCD) or complementary metal oxide semiconductor (CMOS). In this way, the second detection light can be imaged in the light identification unit, and the light identification unit identifies the imaging shape of the second detection light, from which the controller reads and analyzes the shape of the mark to determine the style of the wristband.

It should be noted that the correspondence between color and style mentioned here does not refer to the correspondence in appearance, but rather to the correspondence between the style information of color and the style of the wristband 200. When designing the wrist-worn device, the corresponding relation between color and style can be set first, for example, red corresponds to sports style, yellow corresponds to workplace style, and blue corresponds to travel style. In this way, referring to step S100 again, the relationship between the color and the display mode is set correspondingly, so that the display mode can match the style of the wristband 200.

Further, in this embodiment, as shown in FIG. 3, the wristband 200 includes a connection part 210 and a wristband body 220. The wristband body 220 is connected to the housing 110 through the connection part 210. When the light source 310 is provided on the device body, the color of the connection part 210 and/or the wristband body 220 corresponds to the style of the wristband 200.

Without loss of generality, in this embodiment, as shown in FIGS. 3 to 5, a fixed shaft 120 is fixed on the housing 110, the connection part 210 is provided with a slot 212, and the fixed shaft 120 is engaged in the slot 212 to restrict the detachment of the connection part 210 from the device body 100. A limit convex part 410 is provided at the end of one of the housing 110 and the connection part 210, and a limit groove 213 is provided at the end of the other one. The limit convex part 410 is clamped in the limit groove 213 to limit the rotation of the connection part 210 relative to the device body 100. The fixed shaft 120 can be detachably provided on the housing 110, so that the wristband 200 can be detachably connected to the device body 100, thereby facilitating the user to replace different styles of wristbands 200. The wristband body 220 should be flexible and able to wrap around the user's wrist. In order to ensure a stable connection between the wristband 200 and the device body 100 when the user wears the wristband device, the connection part 210 should be relatively fixed to the housing 110. First, the fixed shaft 120 is engaged with the slot 212 on the connection part 210, which restricts the connection part 210 from falling off the housing 110. Furthermore, in this embodiment, the limit convex part 410 is provided on the housing 110, and the connection part 210 is provided with the corresponding limit groove 213. In this way, the limit convex part 410 is stuck in the limit groove 213, which can limit the rotation of the connection part 210 relative to the device body 100, further ensuring that the connection part 210 can be stably connected to the device.

In this embodiment, the color of at least one of the connection part 210 and the wristband body 220 corresponds to the style of the wristband 200.

In some embodiments, only the color of the connection part 210 can be set to correspond to the style of the wristband 200. To ensure that the identification of the color sensor 321 for light is not affected by the wristband body 220, the material of the connection part 210 can be set to an opaque material, therefore, the first detection light will be reflected at the end surface of the connection part 210 close to the device body 100, greatly shortening the light path and ensuring the light intensity of the second detection light, which will be more conducive to the identification of the color sensor 321.

In some embodiments, only the color of the wristband body 220 can be set to correspond to the style of the wristband 200. To ensure that the first detection light can reach the wristband body 220, the material of the connection part 210 should be set to a light-guiding material. The end surface connecting the wristband body 220 and the connection part 210 can have a color corresponding to the style of the wristband, or the entire wristband body 220 can have a color corresponding to the style of the wristband.

In some embodiments, the color combination of the connection part 210 and the wristband body 220 corresponds to the style of the wristband 200, whereby the color parameter of the second detection light will be determined in a superimposed manner by the color of the connection part 210 and the color of the wristband body 220. The connection parts 210 of multiple sets of wristbands 200 of the same style can be set to the same color, while the wristband bodies 220 of different sets of wristbands 200 can be set to different colors, and the material of the connection part 210 can be set to a light-guiding material. The multiple display modes of the display unit can also be classified into multiple types corresponding to the style type of the wristband 200, and each type includes multiple display modes with similar styles to correspond to multiple wristbands 200 of the same style. In this way, the corresponding relation between the color parameter of the second detection light and the display mode of the display unit can be easily managed.

Further, in this embodiment, the light source 310 is a colorless light source, and the first detection light is a colorless light. In this way, the color of the second detection light will not be affected by the first detection light, making it easier for the color sensor 321 to identify the color. Further, the material of the light guide 400 is set to a colorless light guide material, so that the color of the second detection light is the color of the connection part 210 or the wristband body 220, which can further facilitate the identification of the color sensor 321.

Figure 10:
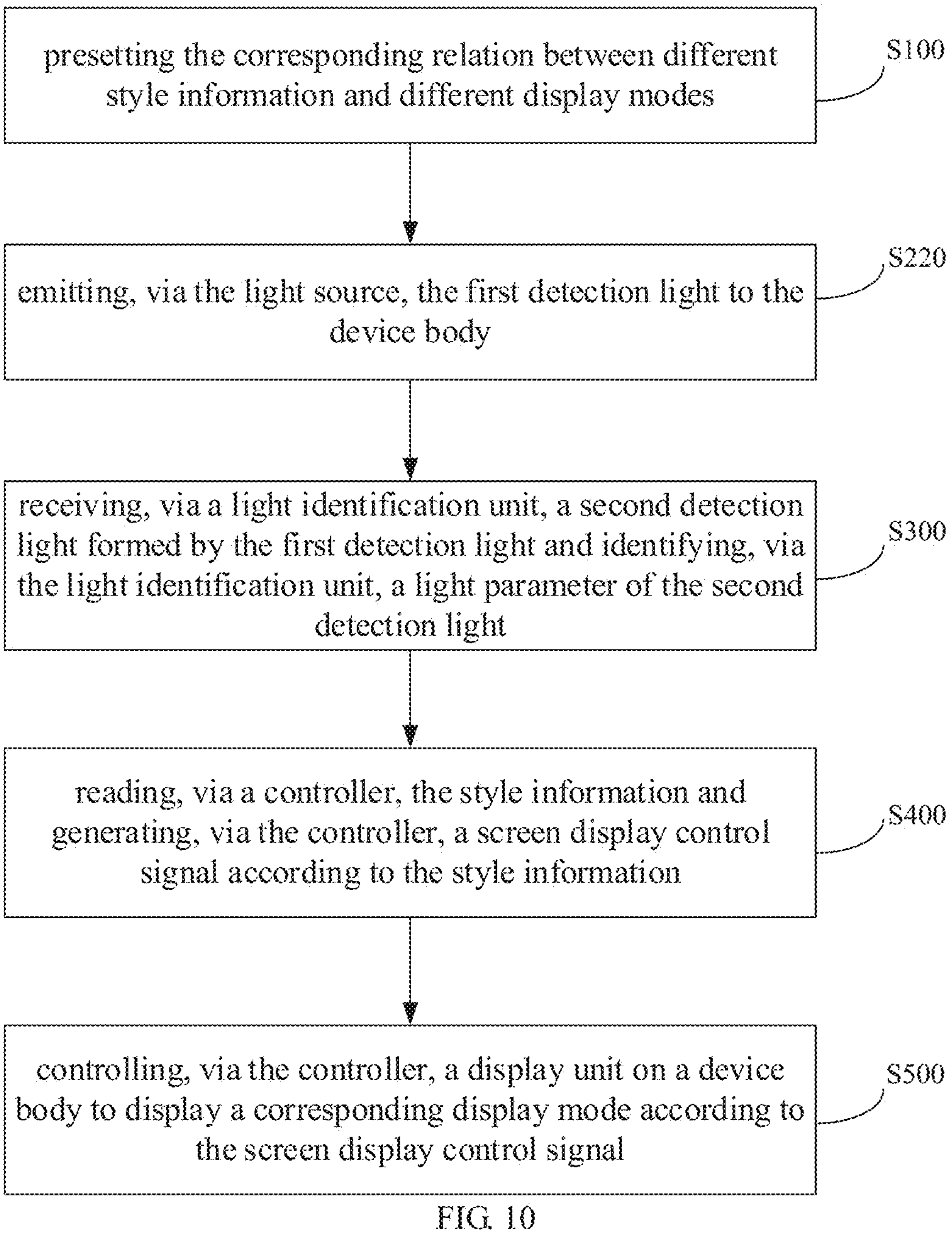
FIG. 10 is a schematic flowchart of the display method according to another embodiment of the present application.

In another embodiment of the present application, the light source is provided on the wristband, and as shown in FIG. 10, the step S200 includes:

S220, emitting, via the light source, the first detection light to the device body; the light parameter of the first detection light corresponds to the style of the wristband, so that the light parameter of the second detection light carries the style information.

Figure 11:
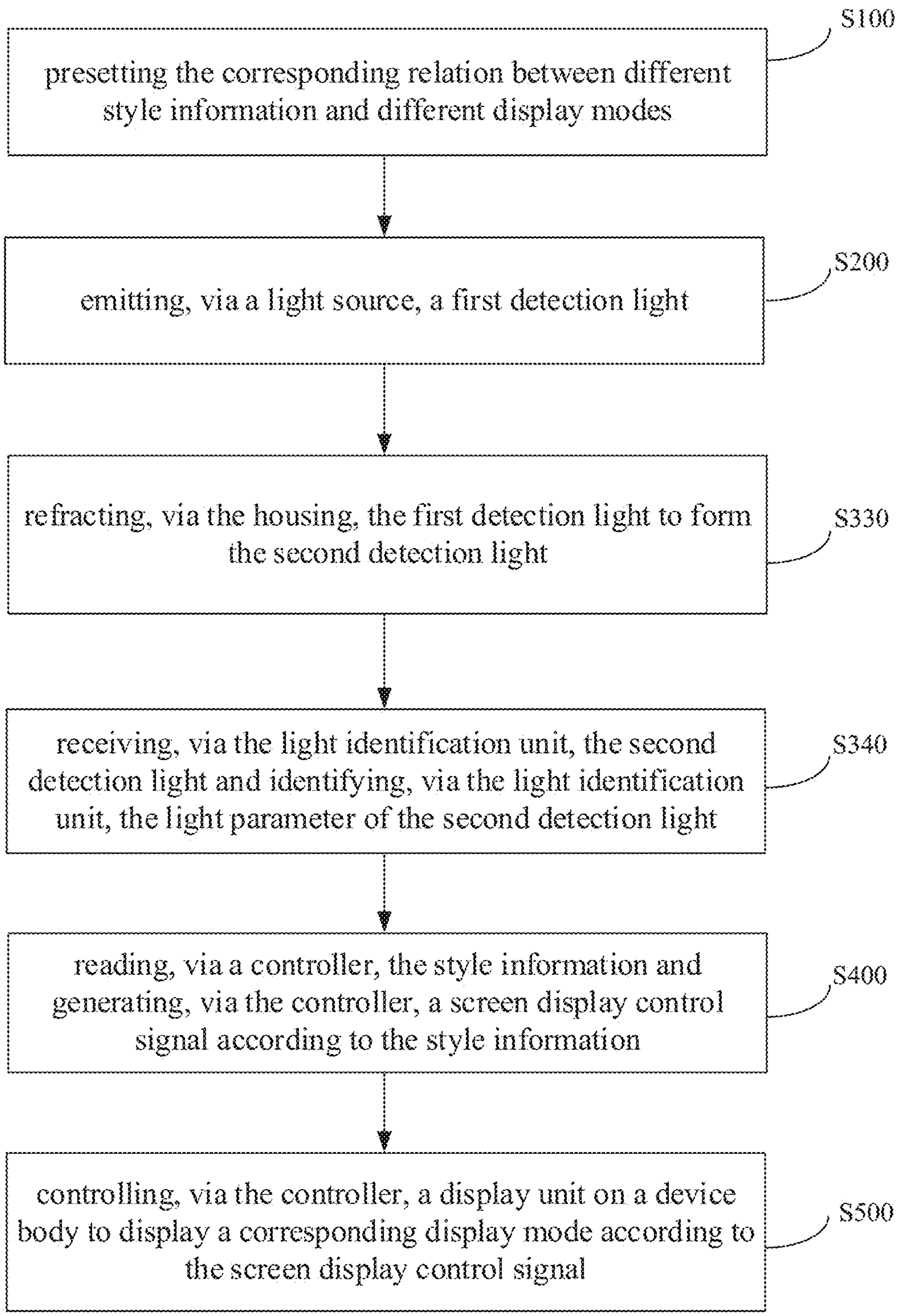
FIG. 11 is a schematic flowchart of the display method according to another embodiment of the present application.

As shown in FIG. 11, the step S300 includes:

S330, refracting, via the housing, the first detection light to form the second detection light; and S340, receiving, via the light identification unit, the second detection light and identifying, via the light identification unit, the light parameter of the second detection light.

In this embodiment, the light source provided on the wristband can emit the first detection light corresponding to the style of the wristband, that is, the light parameter of the first detection light can correspond to the style of the wristband, and the first detection light only needs to be refracted by the housing on the path through which the first detection light propagates to the light identification unit. For a specific device body, the optical properties of the housing are fixed. Therefore, the light parameter of the second detection light will correspond to the light parameter of the first detection light. In order to enable the light parameter of the second detection light to be used as the style information of the wristband, after receiving the second detection light, the light identification unit will identify the light parameter of the second detection light and transfer it to the controller, and the controller can read the style information of the wristband from the light parameter, thereby determining the style of the wristband, and controlling the display unit to display the corresponding display mode.

Further, in this embodiment, the light identification unit is a color sensor. When the light source is provided on the wristband, the color of the first detection light corresponds to the style of the wristband, and the color parameter of the second detection light carries the style information of the wristband.

The step S340 includes:

receiving, via the color sensor, the second detection light and identifying, via the color sensor, the color parameter of the second detection light.

The step S400 includes:

generating, via the controller, the screen display control signal according to the color parameter.

It can be understood that the color of the second detection light will be superimposed on the color of housing where the light is refracted on the basis of the color of the first detection light. For a device body, the color of the housing is fixed, that is, the color of the second detection light will be determined by the color of the first detection light. In this embodiment, the color of the first detection light corresponds to the style of the wristband. Therefore, for the light identification unit, the style information of the wristband can be obtained by identifying the color parameter of the second detection light. For the controller, by reading the color parameter, the style of the wristband can be determined, and according to the screen display control signal formed based on the color parameter, the display unit is controlled to display the display mode corresponding to the style of the wristband.

In other embodiments, the light identification unit can be a CCD or a CMOS, and the light sources on different styles of wristbands are provided at different positions, so that the positions of the light spots formed by the second detection light on the light identification unit are different. Therefore, the position information of the light spots formed by the second detection light becomes the style information of the wristband. The light identification unit identifies the position information of the light spot and transmits it to the controller, which can be used to determine the style of the wristband.

Further, in this embodiment, the light source is a colored light source. That is, the color of the light source in this embodiment will correspond to the style of the wristband. The light sources provided on wristbands of different styles can emit different colors of light. Therefore, the color of the first detection light can correspond to the style of the wristband, and the color parameter of the second detected light is also the style information of the wristband.

In other embodiments, the light source can also be a colorless light source. By arranging the light source in the connection part, the material of the connection part is set to a colored light guide material, and the connection part of different styles of wristbands are set to different colors, that is, the color of the connection part will correspond to the style of the wristband, the colorless light emitted by the light source will propagate to the device body through the connection part, and the first detection light will be superimposed on the color of the connection part, thus, the color of the first detection light can correspond to the style of the wristband, and the color of the second detection light parameter is also the style information of the wristband.

In some embodiments, the wristband is made of a light-guiding material.

When the light source is provided on the device body, the light source is provided on the inner side of the housing, and the first detection light, after being refracted by the housing and reaching the wristband, can be conducted on the wristband to make the wristband emit light. When the light source is provided on the wristband, the light source also emits the first detection light towards a direction away from the device body, and the first detection light can be conducted on the wristband to make the wristband emit light.

In this way, the wristband device with a luminous wristband can be more eye-catching, meet the user's pursuit of individuality, and further enhance the user's experience.

Furthermore, the connection part can be detachably connected to the device body or the wristband body, so that the user can replace different connection parts.

In particular, when the light source is provided on the device body, the material of the connection part is set to a colored light-guiding material, and the material of the wristband body is set to a colorless light-guiding material. The first detection light is colorless light. When reaching the connection part, the first detection light will superimpose the color of the connection part and continue to be transmitted through the wristband body. By simply replacing the connection parts of different colors, the user can make the wristband body emit light with the corresponding color. Furthermore, according to the color of the connection part, the display mode of the UI theme with different color systems can be associated to make the overall style of the wristband device harmonious. In this way, the color style of the UI theme of the display mode and the color style of the wristband body will match the color of the connection part, that is, the color of the connection part is the style information of the wristband. After the first detection light reaches the surface of the connection part and is reflected, the color of the light will become the color of the connection part. The color of the second detection light received by the color sensor will also be the color of the connection part. After the controller reads the color of the second detection light, the luminous color of the wristband, that is, the style of the wristband, can be determined, thereby controlling the display unit to switch the display mode of the UI theme of the corresponding color system. The color system of the UI theme can be a color system that is similar to the color of the connection part, or a color system that matches the color of the connection part and is highly aesthetically pleasing.

In particular, when the light source is provided at the connection part, the material of the wristband body is set to a colorless light guide material, the first detection light has color, and the light source also emits the first detection light towards the direction of the wristband body. The first detection light is transmitted through the wristband body, and the wristband body can also emit light of the same color. By replacing different connection parts, the user can change the color of the first detection light, causing the wristband body to emit light of different colors accordingly. A colorless light source can be provided inside the connection part, but different connection parts have different colors. Alternatively, the connection part is set to be colorless, but different colored light sources are provided on different connection parts, so that different connection parts emits first detection light of different colors. In this way, the color of the first detection light is also the style information of the wristband, and the color of the second detection light will also carry the style information.

In some embodiments, the connection part is non-detachably connected to the wristband body. In an embodiment, the wristband body and the connection part are integrally molded by injection molding. In particular, when the materials of the connection part and the wristband body are different, the connection part and the wristband body can be integrally formed by double-shot molding.

Figure 6:
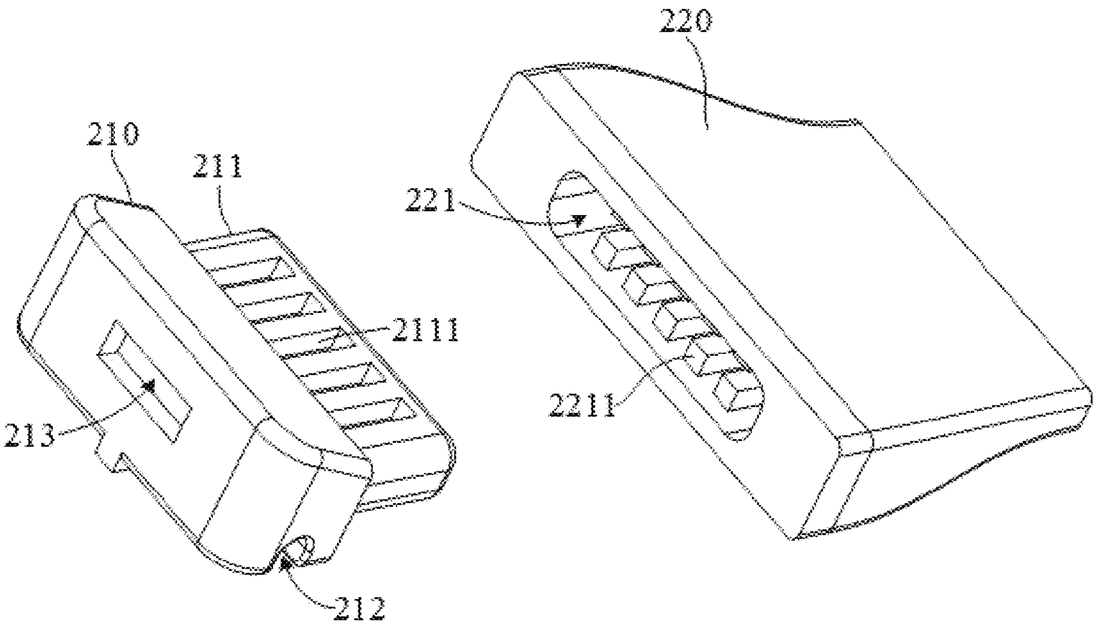
FIG. 6 is an exploded schematic structural view of the wristband of the wrist-worn device according to the present application.

Further, as shown in FIG. 6, one end of the connection part 210 has an embedded convex part 211, one end of the wristband body 220 has an embedded groove 221, and the embedded convex part 211 is accommodated in the embedded groove 221. There are a plurality of embedded sub-grooves 2111 on the side of the embedded convex part 211. In the embedded groove 221, there is an embedded protrusion 2211 corresponding to each embedded sub-groove 2111. The embedded protrusion 2211 is accommodated in the embedded sub-groove 2111 to restrict the detachment of the connection part 210 from the wristband body 220. In this way, the connection part 210 can be prevented from falling off the wristband body 220, thereby further improving the firmness of the connection between the connection part 210 and the wristband body 220. Of course, the connection part and the wristband body can also be two separate components, which are connected together by bonding or welding after each is formed.

The present application also proposes a wrist-worn device. The wrist-worn device includes a memory, a processor, and a display program stored on the memory and executable on the processor. When the display program is executed by the processor, steps of the aforementioned display method are implemented. The specific steps of the display method refer to the above-mentioned embodiments. Since this wrist-worn device adopts all the technical solutions of the above embodiments, it has at least all the beneficial effects brought by the technical solutions of the above embodiments, which will not be repeated here.

The present application also proposes a computer-readable storage medium. The display program is stored in the computer-readable storage medium. When the display program is executed by a processor, the steps of the aforementioned display method are implemented. Therefore, it also has at least all the beneficial effects brought by the technical solutions of the above embodiments, which will not be repeated here.

The above are only optional embodiments of the present application, and do not limit the scope of the present application. Under the inventive concept of the present application, equivalent structural transformations made by using the contents of the description and drawings of the present application, or directly/indirectly applied in other related technical fields, are included in the scope of the present application.

What is claimed is:

1. A display method, applied to a wrist-worn device, comprising:

emitting, via a light source, a first detection light;

receiving, via a light identification unit, a second detection light formed by the first detection light, and identifying, via the light identification unit, a light parameter of the second detection light, wherein the light parameter of the second detection light carries style information of a wristband;

reading, via a controller, the style information, and generating, via the controller, a screen display control signal according to the style information; and controlling, via the controller, a display unit on a device body to display a corresponding display mode according to the screen display control signal, wherein the wrist-worn device comprises the device body and the wristband connected to device body, and wherein the device body has a housing, and the light identification unit is provided on an inner side of the housing; the light source is provided on the device body, and the emitting, via the light source, the first detection light comprises:

emitting, via the light source, the first detection light to the wristband;

receiving, via the light identification unit, the second detection light formed by the first detection light, and identifying, via the light identification unit, the light parameter of the second detection light comprises:

refracting, via the housing, the first detection light and reflecting, via the wristband, the first detection light to form the second detection light; and receiving, via the light identification unit, the second detection light and identifying, via the light identification unit, the light parameter of the second detection light, wherein the light parameter of the second detection light carries an optical property of the wristband, and the optical property of the wristband corresponds to a style, so that the optical property become the style information.

2. The display method of claim 1, wherein before the emitting, via the light source, the first detection light, the display method further comprises:

presetting a corresponding relation between different style information and different display modes.

3. The display method of claim 1, wherein the display mode comprises a UI theme adapted to the style information of the wristband and/or display content adapted to a usage scenario.

4. The display method of claim 3, wherein:

when the light source is installed on the device body, the light source is a white light source, and the first detection light is a white light.

5. A wrist-worn device, comprising a memory, a processor, and a display program stored in the memory and executable on the processor, wherein steps of the display method according to claim 1 are implemented when the display program is executed by the processor.

6. A computer-readable storage medium, wherein a display program is stored in the computer-readable storage medium, and when steps of the display method according to claim 1 are implemented when the display program is executed by the processor.

7. The display method of claim 1, wherein the light identification unit is a color sensor, when the light source is installed on the device body, the first detection light is reflected by the wristband to form a reflected light, a color of the reflected light corresponds to the style of the wristband, so that a color parameter of the second detection light carries the style information of the wristband;

receiving, via the light identification unit, the second detection light and identifying, via the light identification unit, the light parameter of the second detection light comprises:

receiving, via the color sensor, the second detection light and identifying, via the color sensor, the color parameter of the second detection light;

reading, via the controller, the style information and generating, via the controller, the screen display control signal according to the style information comprises:

generating, via the controller, the screen display control signal according to the color parameter.

8. The display method of claim 7, wherein the wristband comprises a connection part and a wristband body, the wristband body is connected to the housing through the connection part, and when the light source is provided on the device body, the color of the connection part and/or the wristband body corresponds to the style of the wristband.

9. The display method of claim 1, wherein:

the wristband is made of a light-guiding material;

when the light source is provided on the device body, the light source is provided on the inner side of the housing, and the first detection light is transmitted through the wristband after being refracted by the housing and reaching the wristband, to cause the wristband to emit light.

* * * * *